W. W. KINCAID.
HOG-SCRAPING APPARATUS.
No. 184,390. Patented Nov. 14, 1876.
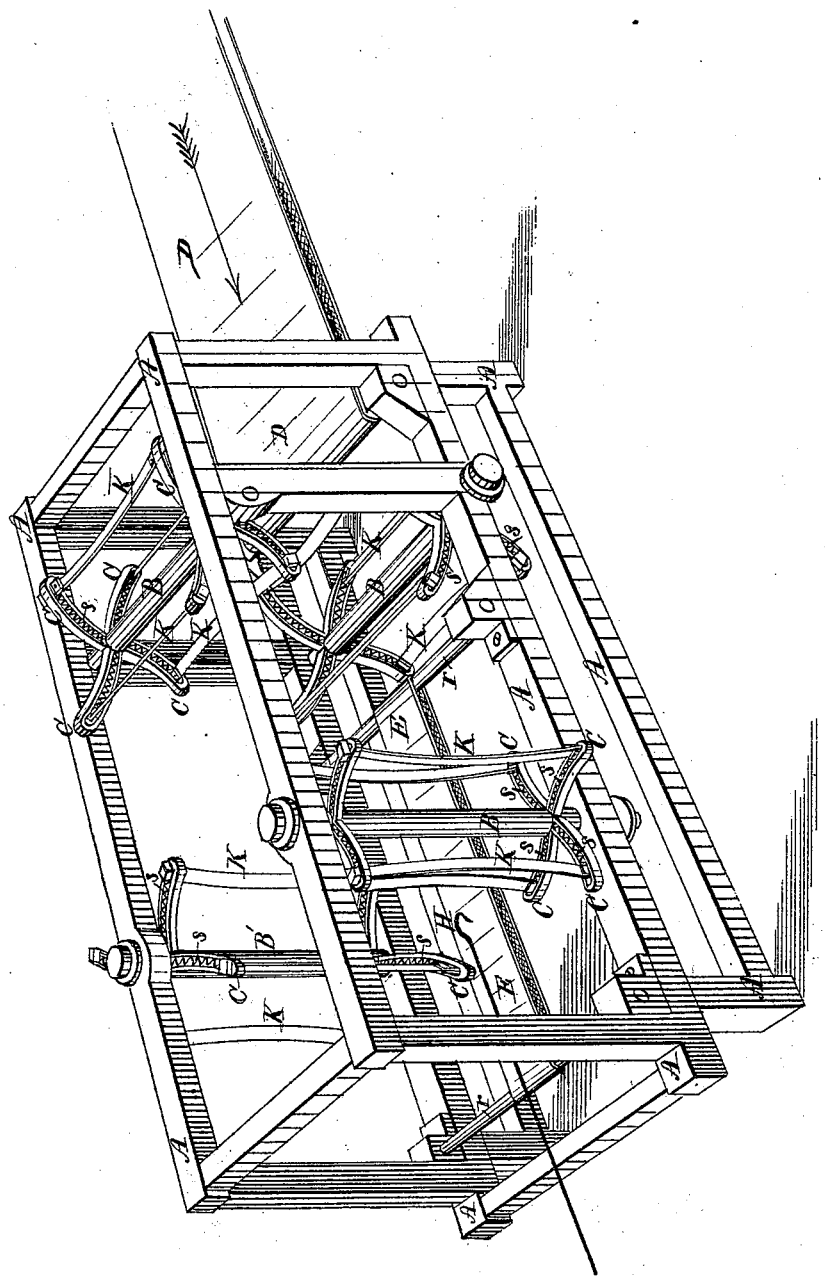
Witnesses:
F. B. Townsend
C. H. Brown
Inventor:
Wm. W. Kincaid,
By his Attorneys,
Stansbury & Munn.

UNITED STATES PATENT OFFICE.

WILLIAM W. KINCAID, OF CHICAGO, ILLINOIS, ASSIGNOR OF ONE-HALF HIS RIGHT TO FRANK BURNESS, OF SAME PLACE.

IMPROVEMENT IN HOG-SCRAPING APPARATUS.

Specification forming part of Letters Patent No. 184,390, dated November 14, 1876; application filed September 29, 1876.

*To all whom it may concern:*

Be it known that I, WILLIAM W. KINCAID, of Chicago, in the State of Illinois, have invented a Machine for Scraping and Cleaning Hogs; and I do hereby declare the following to be a correct description of the same, reference being had to the drawing made part hereof, which is a perspective view of the machine.

The nature of the invention consists in the construction of a machine for scraping and cleaning slaughtered hogs, by passing them on endless aprons between rapidly-revolving scraping-knives attached, so as to be yielding and self-adjusting, to the arms of a series of reels hung vertically and horizontally in a suitable frame, and driven by any proper power, all as hereinafter more particularly set forth.

In the drawing, A marks a stout frame, in which are hung the revolving shafts B B B' B' of four reels, the shafts B B being horizontal, and the shafts B' B' being vertical, as shown. Each of these shafts is provided with cross-arms C, to the extremities of which concave scraping-knives K are attached. The arms C may be slotted, as shown in the drawings, each slot being provided with a spiral spring, s, reacting outwardly to press the ends of the knife-blades toward the ends of the arms, respectively, and yet allow the knives to yield when required to a force acting in the opposite direction. If preferred, the arms C may be simple rods having spiral springs around them, and the knives may play on the rods, and be confined by nuts on the ends of the arms. An endless belt, D, is placed at the feed end of the machine, and revolves in the direction of the arrow to introduce the hog between the first pair of scraping-reels. After passing this pair, the hog is received on a second endless apron, E, when it is caught by the hook H, and drawn through between the pair of upright reels. The hook H may be attached to a chain or rope wound on a drum driven by a band or gearing, in any usual way. The reels may be banded or geared together, and driven by the same motor in any well-known mode.

It is apparent from the construction that the knives will adapt themselves to any variation in the sizes of the animals subjected to its action, and will conform to the irregularities of their surfaces.

What I claim is—

In a machine for scraping and cleaning slaughtered hogs, a series of upright and horizontal revolving reels, provided with yielding knives or scrapers, arranged to operate upon animals of different sizes passing through the machine on endless belts or aprons, substantially in the manner described.

The above specification of my invention signed and witnessed, at Chicago, this 6th day of September, A. D. 1876.

WILLIAM W. KINCAID.

Witnesses:
LESTER S. SWEZEY,
ELLMER J. CHAMBERLIN.